US005465033A

United States Patent [19]

Fassih-Nia

[11] Patent Number: 5,465,033

[45] Date of Patent: Nov. 7, 1995

[54] UNIVERSAL SAFETY SYSTEM FOR AUTOMATIC DOORS

[75] Inventor: Mohammed Fassih-Nia, Garland, Tex.

[73] Assignee: Texas Optoelectronics, Inc., Garland, Tex.

[21] Appl. No.: 250,552

[22] Filed: May 27, 1994

[51] Int. Cl.$^6$ .......................... G05B 5/00

[52] U.S. Cl. .......................... 318/480; 318/17; 318/445; 318/466

[58] Field of Search .......................... 318/480, 17, 445, 318/466; 49/26; 160/291

[56] References Cited

U.S. PATENT DOCUMENTS

| | | | |
|---|---|---|---|
| 2,740,856 | 4/1956 | Doeg . | |
| 2,752,150 | 6/1956 | Richmond et al. . | |
| 2,909,718 | 10/1959 | Lawick . | |
| 3,240,484 | 3/1966 | Klamp . | |
| 3,277,256 | 10/1966 | Jones . | |
| 3,445,848 | 5/1969 | Goldstein . | |
| 3,754,187 | 8/1973 | Deming | 318/480 |
| 4,273,974 | 6/1981 | Miller . | |
| 4,922,168 | 5/1990 | Waggamon et al. . | |
| 4,988,992 | 1/1991 | Heitschel et al. | 318/466 |
| 5,023,411 | 6/1991 | Miller et al. . | |
| 5,233,185 | 8/1993 | Whitaker . | |

*Primary Examiner*—William M. Shoop, Jr.
*Assistant Examiner*—Karen Masih
*Attorney, Agent, or Firm*—Haynes and Boone

[57] ABSTRACT

A safety system comprises a light beam transmitter and receiver and means connected through a standard AC power plug to the main power supply of an automatic garage door opener for controlling the power thereto. The transmitter transmits a beam of light across the opening of a garage door. The receiver is positioned to receive the light beam if there is nothing obstructing the beam. The receiver generates a signal indicating when the beam is being received. The means disconnects the power to the garage door opener when a signal is generated indicating that the light beam is not being received. The garage door is thus prevented from making contact with and hurting or damaging a person or object in its path.

12 Claims, 3 Drawing Sheets

UNIVERSAL SAFETY SYSTEM FOR AUTOMATIC DOORS

TECHNICAL FIELD

This invention relates to a safety system for universal attachment to automatic garage door openers and, more particularly, to a system for using light beam sensors and relays to control the power to an automatic garage door opener.

BACKGROUND OF THE INVENTION

Automatic garage door openers are commonly powered by electric motors actuated by manual, momentary closing of electric switches, the motors being then maintained in operation by holding circuits until the door is fully open or fully dosed, at which time limit switches function to stop the motors. A disadvantage of this system has been that the operator may press the button without first being sure that the door opening is free of obstructions, or he may press the button and then walk away, with the result that an obstruction such as a person or an automobile may move into the path of the closing door, with the consequence of injury or damage.

The problem described is often resolved by providing a door operating system of the class described with the addition of control means operable to stop the operating motor automatically if any obstruction enters or approaches the door as it is being closed. This is often accomplished by providing light beams positioned to traverse the door opening, and the approaches thereto, and photoelectric cells energized by the light beams to close circuits maintaining the motor in operation, whereby if any of the light beams are interrupted, the motor will be stopped.

The prior art provides for such means to be integrated into the design, and communicate with the board electronics, of automatic garage door opener systems. This presents a problem with garage door opener designs that are not equipped with such safety systems, particularly older designs. Furthermore, automatic garage door openers that are equipped with safety systems may eventually require replacement or updating to meet particular regulatory requirements, and in such cases, it can be difficult and/or costly to replace or retrofit these systems with safety systems.

Therefore, what is needed is a universal safety system that may be adapted for use with any automatic garage door opener.

SUMMARY OF THE INVENTION

The foregoing problems are solved and a technical advance is achieved by a universal light beam sensor system that can be adapted for use with any automatic garage door opener. In a departure from the art, a controller having an AC (alternating current) power outlet is used to control the supply power to any brand of automatic garage door opener. A transmitter and receiver are connected to the controller and placed in the path of the garage door, such that when the door path is obstructed, the light beam between the transmitter and receiver is interrupted causing the controller to disconnect power to the door opener.

In a preferred embodiment, a safety system for universal attachment to existing automatic garage door openers comprises a transmitter positioned to transmit a beam of light across the opening of the garage door, and a receiver positioned to receive the light beam from the transmitter. The receiver also generates a signal indicating whether the light beam is being received. Means are provided for controlling the supply of power to the garage door opener if and only if the signal generated by the receiver indicates that the beam is being received.

The present invention results in several technical advantages. For example, because the controller directly controls the power of the automatic garage door opener via an AC outlet, the controller can be used universally with virtually any automatic garage door opener system.

A further technical advantage achieved with the present invention is that installation is greatly simplified because the controller does not need to communicate with or be integrated into the design of the board electronics of the automatic garage door opener.

A further technical advantage achieved with the present invention is that only one pair of wires need to be run from the control unit to the transmitter and receiver, thereby economizing on the quantity of wire required to implement the invention. By economizing on the use of wire, and/or by using a current source with the transmitter and receiver, the susceptibility of the wires to environmental noise from such sources as appliances, microwaves, and radio transmitters is reduced.

DESCRIPTION OF THE PREFERRED EMBODIMENTS

Figure 1:
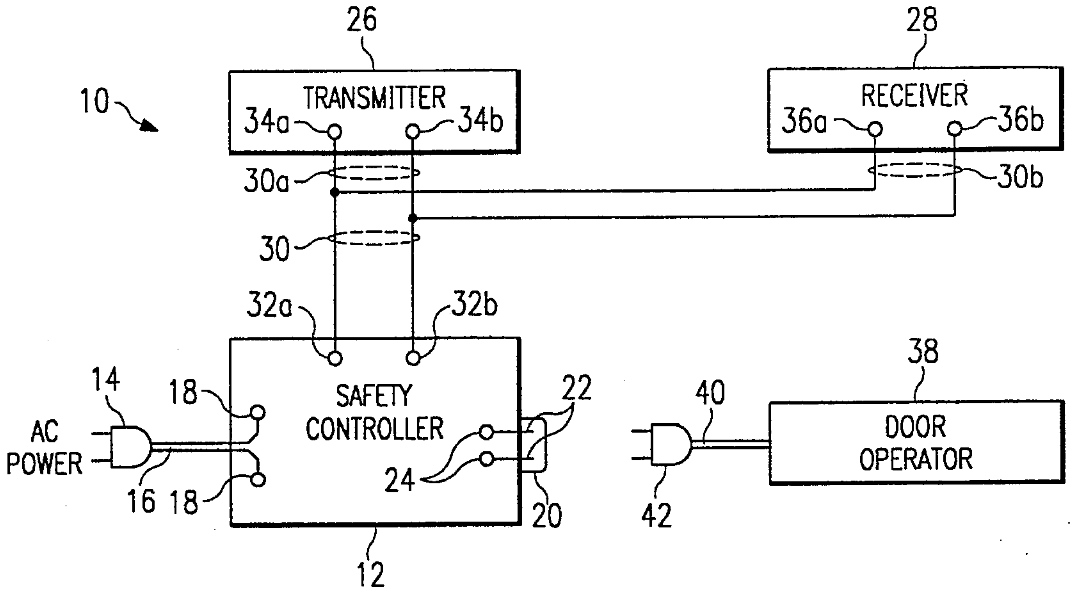
FIG. 1 is a functional block diagram of a garage door safety control system embodying features of the present invention.

In FIG. 1, the reference numeral 10 designates a preferred embodiment for a universal safety system for doors comprising a safety controller 12 having a 120 volt AC power inlet plug 14 connected to the unit via lines 16 and terminals 18, an AC power outlet adapter 20 connected to the unit via lines 22 and terminals 24, and a transmitter 26 and receiver 28 connected to the unit via lines 30, 30*a*, and 30*b* and terminals 32*a*, 32*b*, 34*a*, 34*b*, 36*a*, and 36*b*. An automatic garage door operator 38 receives power from the safety controller 12 via line 40 and plug 42 adapted to connect with adapter 20.

Figure 2:
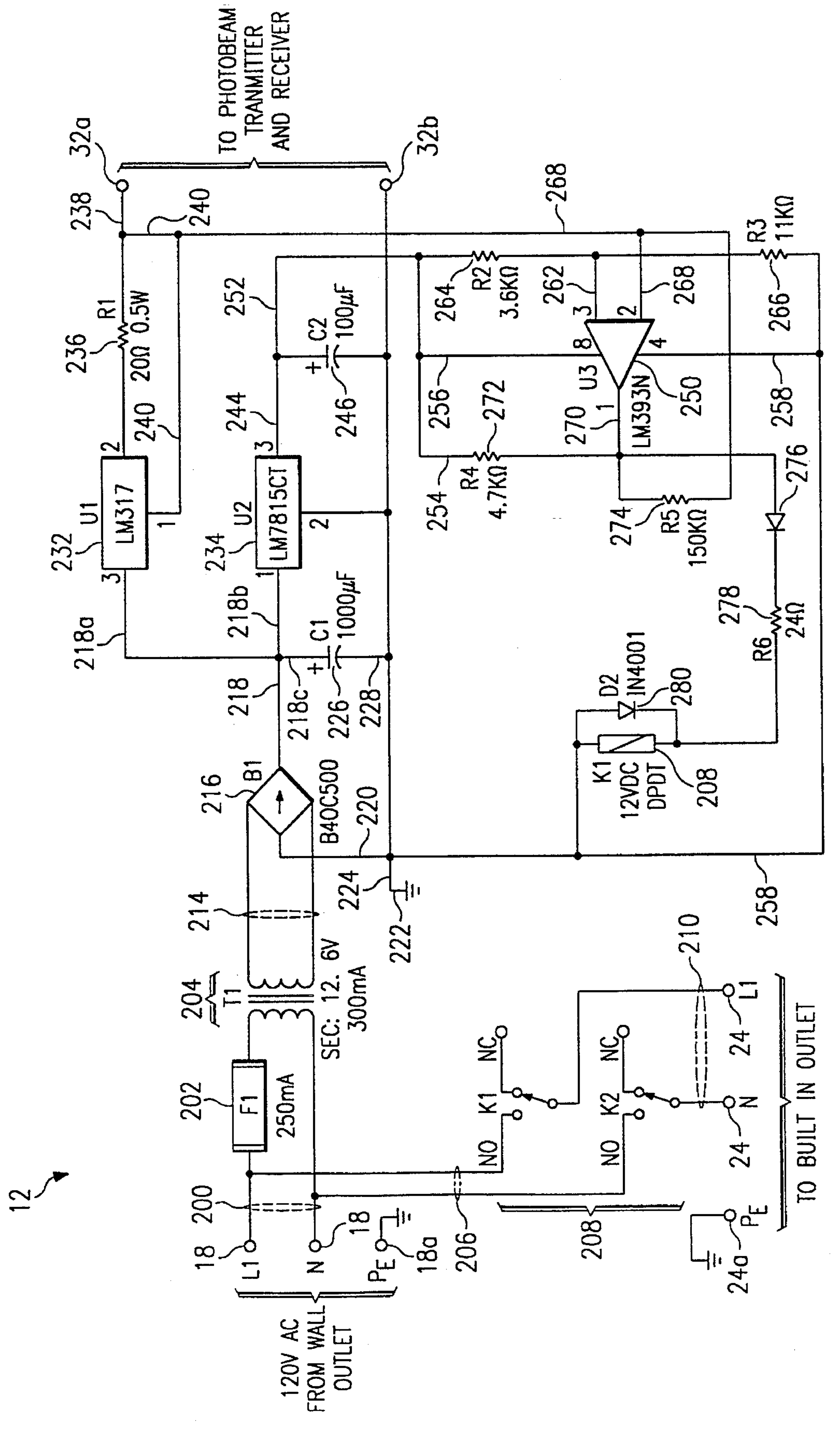
FIG. 2 is a schematic of the controller circuit of FIG. 1.

Referring to FIG. 2, 120 volt AC power is received through the terminals 18 onto the lines 200 and passed through a fuse 202, a transformer 204, and a line 206 to a relay 208. The terminals 18 and 24 include ground (PE or Position Earth) connections 18*a* and 24*a* respectively. The fuse 202 protects the circuitry, though not the relay 208, of the controller 12 from receiving over 250 mA of current (at 120 volts). The relay 208 is a double pole, double throw 12 volt relay, and may be in a normally open (NO) or normally dosed (NC) position. In the NO position, AC power may pass from the terminals 18 through the lines 200, the lines 206, the relay 208, lines 210, and the terminals 24 to provide power for the door opener 34. In the NC position, no power is passed to the terminals 24, rendering the system 10 failsafe.

Power applied to the transformer 204 from the line 200 is transformed from 120 volts to approximately 12.6 volts having 300 mA of current which is output on lines 214 to a bridge rectifier 216. The rectifier 216 converts the AC power input on lines 214 to DC (direct current) power, the positive side of which is output on line 218, and the negative side of which is output on line 220. Line 220 is also connected to ground 222 via a ground line 224. The DC power from the rectifier 216 is debounced using a 1,000 μF filter capacitor 226 which is connected between the positive side of the rectifier via the lines 218 and 218*c*, and the negative, or ground, side of the rectifier via the lines 228, 224, and 220.

The rectifier 216 is connected to two linear voltage regulators 232 and 234 via lines 218*a* and 218*b* respectively. The regulator 232, a variable voltage regulator, is used as a current source having pins 1–3 and is commonly available from many manufacturers as part number LM317. The regulator 232 outputs from pin 2 up to 62.5 mA of current through a 20Ω resistor 236 on a line 238. Pin 1 of the regulator 232 operates as a feedback input for generating the 62.5 mA output.

The regulator 234, a fixed voltage regulator commonly available from many manufacturers as part number LM7815CT, provides a constant 15 volt output onto a line 244. The output from the regulator 234 is further stabilized by a capacitor 246 connected between the line 244 and the ground line 224.

As shown in FIG. 2, a circuit is formed between the regulator 234 and a voltage comparator 250 by the line 244, a line 252, a line 254, and a supply pin 8 of the voltage comparator 250. Comparator 250, having pins 1–8, is commonly available from many manufacturers as part LM 393N. The supply pin 8 and a supply pin 4 form the respective positive and negative supply pins of the comparator 250. Pin 4 is connected to the ground line 224 via a line 258.

Pins 2 and 3 of the comparator 250 form respective inverting and noninverting inputs to the comparator. A line 262 connects the pin 3 to a 3,600Ω resister 264 which connects to the lines 252 and 254, forming thereby a circuit between the voltage regulator 234 and the comparator 250. Line 262 also connects to the line 258 via an 11,000Ω resister 266. The resisters 264 and 266 together form a voltage divider so that a constant reference voltage of 11.3 volts is supplied to the pin 3 via the line 262. A line 268 connects the pin 2 to the line 240.

The output of the comparator 250 passes from the pin 1 onto a line 270, which line is connected to the line 254 via a 4,700Ω pull-up resister 272. The line 270 is also connected to the line 268 via a 150,000Ω resister 274 for reducing oscillation that could result from hysteresis. As will be described in greater detail subsequently, the output on line 270 is a function of how the voltages on the pins 2 and 3 of the comparator 250 compare.

The line 270 is also connected to the anode of a diode 276 so that current won't flow back to the line 270, thereby protecting the comparator 250. The cathode of the diode 276 is connected to one end of a 24Ω resister 278 for reducing a high voltage of 15 volts on the line 270 to 12 volts. The other end of the resister 278 is connected to the relay 208. A reverse biased damp diode 280 is connected in parallel across the relay 208 so that, when the relay is activated or deactivated, the self-inductive voltage generated in the coil of the relay doesn't damage the circuit. It can be appreciated that the terminals 24 are activated only when the relay 208 is energized, thereby rendering the system 10 failsafe.

Figure 3:
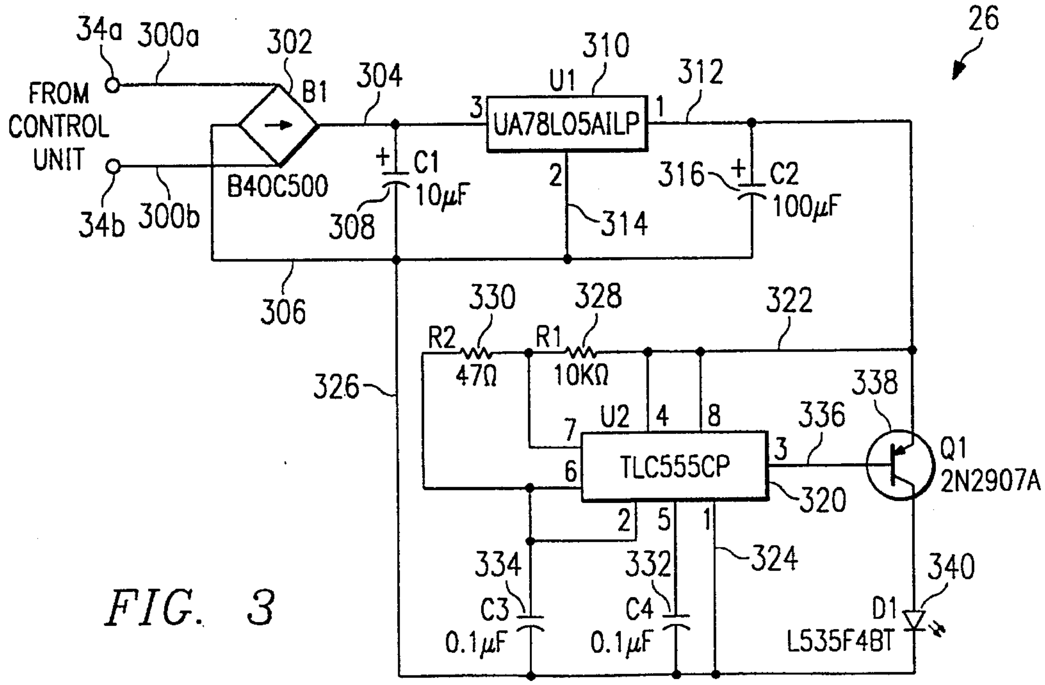
FIG. 3 is schematic of the transmitter circuit of FIG. 1.

Referring to FIG. 3 showing the transmitter 26 of the present invention, the voltage applied to the terminals 34*a* and 34*b* via the lines 30*a*, is input to a rectifier 302 via lines 300*a* and 300*b*. The rectifier 302 ensures that, regardless of the polarity of the voltage applied at the terminals 34*a* and 34*b*, positive voltage is applied on a line 304 and negative voltage is applied on a line 306. Filter capacitor 308 is connected between the lines 304 and 306 for stabilizing the voltage therebetween.

The voltage on the line 304 is applied to a pin 3 of a linear voltage regulator 310, having pins 1–3, and being commonly available from many manufacturers as part number UA78L05AILP. Pin 1 of the regulator 310 outputs a constant positive 5 volts on a line 312. Pin 2 of the regulator 310 is connected to the line 306 via a line 314. The lines 312 and. 314 are connected together via a 100 μF output filter capacitor 316 to stabilize the voltage on the line 312.

A timer 320 is connected to the regulator 310 via a line 322, and to the negative side of the rectifier 302 via a line 324 and 326. Two resisters 328 and 330 and two capacitors 332 and 334 are connected to the timer 320 in a manner commonly known in the art and will, therefore, not be described in greater detail here. The timer 320 outputs a 1,400 Hz signal to the base of a pnp transistor 338, the transistor having part number 2N2907A and being commonly available from many manufacturers. The output of the timer 320 is low for approximately 10 μs and high for approximately 700 μs. The emitter of the transistor 338 is connected to the line 312 and the collector of the transistor is connected to the anode of an infrared light emitting diode (IRED) 340, which IRED is commonly available from many manufacturers. The cathode of the IRED 340 is connected to the negative side of the rectifier 302 via the line 326. It can be appreciated that when output from the timer 320 is low, current passes through the transistor 338 from the line 312 through the transistor to the IRED 340 causing light to be emitted therefrom. Similarly, when output from the timer 320 is high, no current is passed to the IRED 340, so that the IRED is not illuminated. The IRED 340 flashes on and off in such manner at 1,400 Hz.

Figure 4:
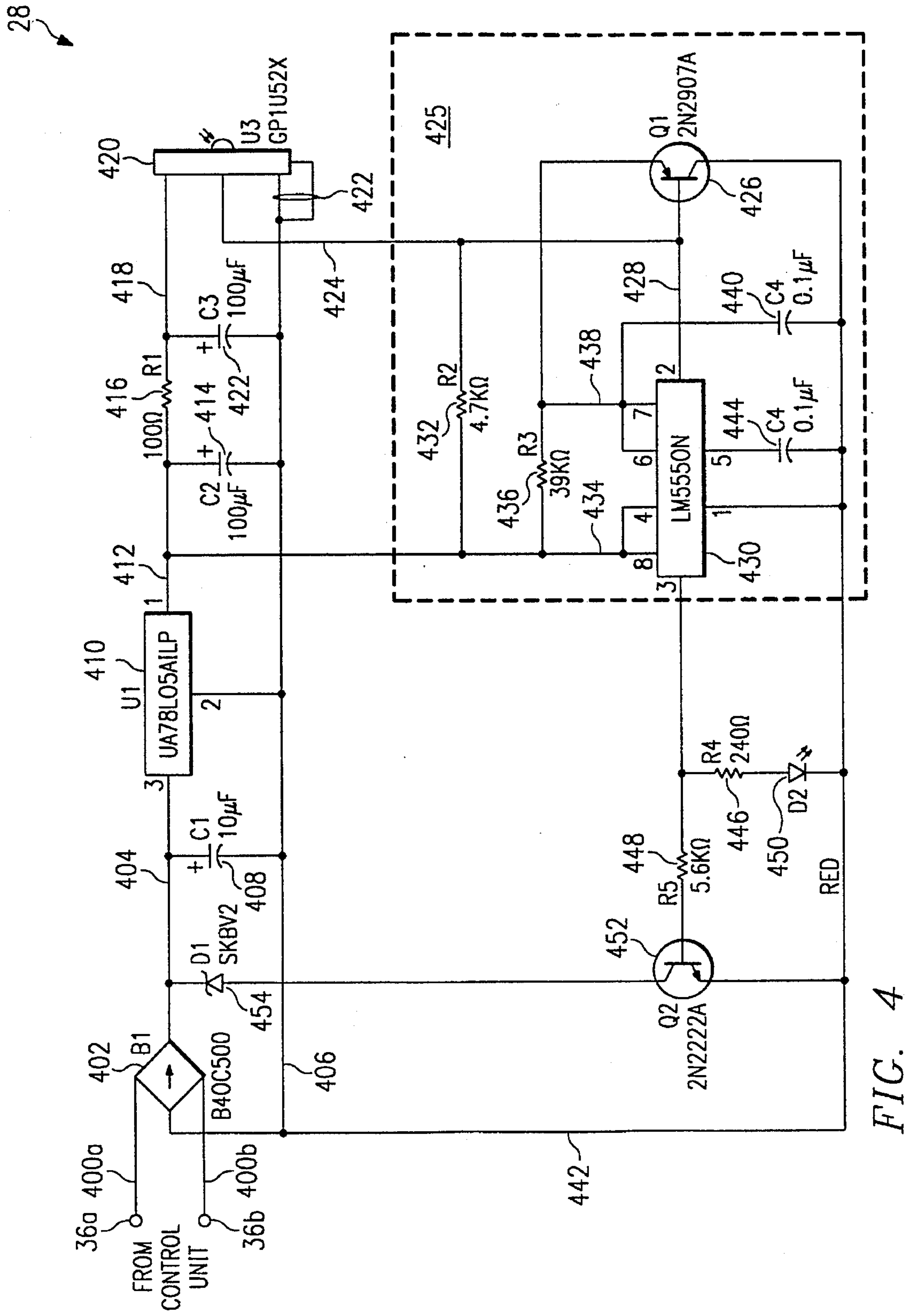
FIG. 4 is s schematic of the receiver circuit of FIG. 1.

Referring to FIG. 4 showing the receiver 28 of the present invention, the voltage applied to the terminals 36*a* and 36*b* via the lines 30*b*, is input to a rectifier 402 via lines 400*a* and 400*b*. The rectifier 302 ensures that, regardless of the polarity of the voltage applied at the terminals 36*a* and 36*b*, positive voltage is applied on a line 404 and negative voltage is applied on a line 406. Filter capacitor 408 is connected between the lines 404 and 406 for stabilizing the voltage therebetween.

The voltage on the lines 404 and 406 is applied to a linear voltage regulator 410, which has pins 1–3 and is commonly available from many manufacturers as part UA78L05AILP. The regulator 410 outputs from pin 1 a constant positive 5 volts on a line 412. A filter capacitor 414 is connected between the lines 412 and 406 for stabilizing the voltage therebetween. Pin 2 is grounded to the line 406.

A 100Ω resister 416 is connected between the line 412 and a line 418 which supplies the input current for an infrared light beam detector 420, which detector is available from Sharp Electronics as part number GP1U52X. A capacitor 422 is connected between the line 418 and the negative voltage line 406. The capacitor 422 in combination with the resister 416 provide an electronic filter for the detector 420 to filter out environmental noise from such sources as appliances, microwaves, and radio transmitters. The line 406 is connected to the negative side of the detector 420 via lines 422. A signal from the detector 420, which is high if light is detected and low otherwise, is output on a line 424.

The signal on the line 424 is input to a missing pulse circuit 425, and more particularly, to the base of a pnp transistor 426, which transistor has part number 2N2907A and is commonly available from many manufacturers. The line 424 is also connected to a line 428 which is connected to a pin 2 of a missing pulse timer 430, which timer has pins 1–8 and is available from many manufacturers as part number LM555CN. The output line 424 is further connected to one end of a resister 432, the other end of which is connected to the line 412 and a line 434, which line 434 is connected to pins 4 and 8 of the timer 430. The line 434 is further connected to a resister 436, the other end of which is connected to the emitter of the transistor 426 and the line 438, which line 438 is further connected to pins 6 and 7 of the timer 430 and to one end of a 0.1 μF capacitor 440. The other end of the capacitor 440 is connected to a line 442, which line is connected to the line 406. Pin 1 of the timer 430 is connected directly to the line 442, and pin 5 is connected to the line 442 via a 0.1 μF capacitor 444.

Pin 3 of the timer 430 is connected to one end of a 240Ω resister 446 and a 5,600Ω resister 448. The other end of the resister 446 is connected to the anode of a red indicator light emitting diode (LED) 450, the cathode of which LED is connected to the line 442. The LED 450 is contained in the receiver housing (not shown) and is activated when the signal output from the timer 430 on the pin 3 is high, thus indicating that the detector 420 is being energized by infrared light. The other end of the resister 448 is connected to the base of an npn transistor 452, which transistor has part number 2N2222A and is commonly available from many manufacturers. The emitter of the transistor 452 is connected to the line 442, and the collector of the transistor is connected to the anode of an 8.2 volt Zener diode 454, the cathode end of which diode is connected to the line 404.

In operation, the controller 26 supplies voltage on the lines 30 to the transmitter terminals 34*a,* 34*b* and the receiver terminals 36*a,* 36*b*. The transmitter 26 transmits a 1,400 Hz beam of infrared light from the IRED 340. The IRED 340 and the detector 420 are arranged so the light beam traverses the opening of a garage door and energizes the detector 420 if the light beam is not interrupted by an obstruction in the opening of the door.

While the beam remains uninterrupted, and the timer 430 does not sense a missing pulse from the 1,400 Hz beam, a high state is output on the pin 3 of the timer 430 turning the transistor 452 on, creating thereby a potential across the Zener diode 454 sufficient to overcome the breakdown voltage of the diode. A short is then created between the lines 404 and 406 resulting in a potential between the terminals 36*a* and 36*b* of 8.2 volts. The 8.2 volts are applied to both the transmitter 26 and the receiver 28, but is of no effect to the transmitter since the transmitter is regulated to operate on 5 volts. The 8.2 volts are sensed at the pin 2 of the voltage comparator 250. Because the 8.2 volts are less than the 11.3 reference volts at the pin 3 of the comparator 250, the output at line 1 of the comparator is high causing the relay 208 to close the circuit so that power may be output to the garage door opener via the lines 210 and the terminals 24.

When the beam from the transmitter 26 is interrupted, and the timer 430 senses at least one missing pulse from the 1,400 Hz beam, then the transistor 452 is turned off so that the voltage between the lines 404 and 406 remains high (i.e., at a maximum compliance voltage level). Again, this has no effect on the transmitter 26. However, the high voltage is sensed at the pin 2 of the voltage comparator 250. Since the high voltage is greater than the 11.3 reference volts at the pin 3 of the comparator 250, the output at line 1 of the comparator is low, causing the relay 208 to open the circuit so that no power may be output on the lines 210 to the garage door opener.

The embodiment of the present invention as described herein has many advantages over the prior art, including, for example, universal and simple adaptability to virtually any existing garage door opener. It has a power plug outlet to control the garage door power directly and does not require integration into the electrical circuitry of an existing garage door operator.

A further technical advantage achieved with the present invention includes economy as a result of using a two-wire, non-polarized system. This permits the power supplied to the transmitter and receiver to be carried on a single pair of wires. Compared to using two pairs of wires, a single pair of wires is also less sensitive to electrical noises from such sources as appliances, microwaves, and radio signals.

It is understood that the present invention can take many forms and embodiments. The embodiments shown herein are intended to illustrate rather than to limit the invention, it being appreciated that variations may be made without departing from the spirit or the scope of the invention. For example, the present invention may be adapted for use with any automatic door or gate having power supplied through a standard plug adapter.

In another embodiment, multiple transmitters 26 and receivers 28 may be used whereby multiple beams traverse the opening of a garage door. This would permit greater coverage of the opening and thus greater safety.

In still another embodiment, the transmitter 26 and receiver 28 may be arranged so that the beam projected therebetween traverses the perimeter of a pool. Alerting means, such a horn, may be connected to receive power from the power outlet adapter 20 and be thereby activated when the beam is interrupted. Such an embodiment would be useful for alerting parents or guardians when a child is about to enter a pool, and thus enhance the safety of the pool.

In a still further embodiment, other frequencies of light could be used, such as white light, or laser.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A safety system for universal attachment to an automatic garage door opener having a plug for receiving power from a standard wall outlet, the system comprising:

a transmitter positioned to transmit a beam of light across the opening of said garage door;

a receiver positioned to receive said light beam from said transmitter if said beam is not interrupted, and for generating a signal indicating whether said light beam is received or interrupted; and controller means electrically connected to said transmitter and said receiver, said controller means having a plug adapter for receiving said plug and controlling said power to said opener therethrough, said controller means being responsive to said signal so that said power to said garage door opener is supplied if said signal indicates that said beam is being received, said power being disconnected otherwise.

2. The system of claim 1 further comprising a plurality of transmitters and receivers positioned so that light beams are projected horizontally at different heights across the opening of said door.

3. A method for controlling the operation of an automatic garage door opener having a plug for receiving power from a standard wall outlet, the method comprising the steps of:

transmitting a pulsating beam of energy across the path of said door;

receiving said beam if said beam is not interrupted;

generating a first signal if pulses of said beam are received, or a second signal if pulses of said beam are not received; and responsive to said signal, controlling said power supplied through said outlet so that said power is supplied therethrough if said first signal is generated, and so that said power is not supplied therethrough if said second signal is generated.

4. The method of claim 3, wherein said generating comprises:

measuring the time between two consecutive pulses of light;

determining if said measured time is less than a predetermined quantity of time;

responsive to a determination that said measured time is less than said predetermined quantity of time, causing said first signal to be generated; and responsive to a determination that said measured voltage is not less than said predetermined quantity of time, causing said second signal to be generated.

5. The method of claim 3, wherein the voltage potential of said first signal is less than the voltage potential of said second signal.

6. A system for controlling an automatic door operator, which operator includes a plug for receiving power from a standard wall outlet, the system comprising:

a relay connectable between said plug and said outlet, for switchably controlling the power transferred therebetween;

circuitry connectable for receiving power from said outlet, said circuitry including two terminals, and a current source for supplying substantially constant direct current (DC) to said terminals, said circuitry being connected for switching said relay on when the voltage across said terminals is within a first predetermined voltage range, and for switching said relay off when the voltage across said terminals is within a second predetermined voltage range;

means, connected to said terminals, for transmitting a pulsating beam of light across the path of said door;

means, connected to said terminals in parallel with said transmitting means, for receiving said beam if said beam is not interrupted;

means for determining whether said receiving means is receiving pulses of said beam; and means, in response to a determination that a pulse of said beam is received by said receiving means, for causing the voltage across said terminals to be within said first predetermined voltage range so that said relay is switched on, and in response to a determination that a pulse of said beam is not received by said receiving means, for causing the voltage across said terminals to be within said second predetermined voltage range so that said relay is switched off.

7. The system of claim 6 wherein the maximum voltage potential in said first predetermined voltage range is less than the minimum voltage potential in said second predetermined voltage range.

8. The system of claim 7 wherein:

said causing means includes a resistor connected in parallel with said receiving means across said terminals, and a Zener diode and a gate coupled in series and connected in parallel with said resistor across said terminals, said gate being in an off state unless a sufficiently high voltage is applied thereto to turn on said gate, said resistor and Zener diode being sized so that, when said gate is turned on, the voltage across said terminals is in said first voltage range, and when said gate is in said off state, the voltage across said terminals is in said second voltage range;

said receiving means includes a beam detector which converts beam pulses to electrical pulses;

said determining means includes a missing pulse timer connected for receiving said electrical pulses and for determining whether or not a pulse of said transmitted beam is received by said detector, wherein, upon a determination that said pulse is received, supplying sufficient voltage to said gate to turn on said gate, and, upon a determination that said pulse is not received, supplying insufficient voltage to turn on said gate;

whereby said relay is closed when said pulses are received, thereby permitting power to be transferred through said outlet to said opener; and whereby said relay is open when said pulses are not received, thereby preventing power from being transferred through said outlet to said opener.

9. The system of claim 8 wherein said missing pulse timer comprises:

means for measuring the elapsed time between two consecutive pulses; and determining whether said measured time is less than a predetermined quantity of time, wherein a determination that said measured time is less than said predetermined quantity of time corresponds to a determination that a pulse is received, and a determination that said measured time is not less than said predetermined quantity of time corresponds to a determination that a pulse is not received.

10. The system of claim 8, wherein:

the cathode of said Zener diode is connected to receive positive current from said terminals; and said gate is a bipolar junction (BJT) transistor having:

a collector connected to the anode of said Zener diode, an emitter connected to receive negative current from said terminals, and a base connected to receive said voltage supplied by said missing pulse timer.

11. The system of claim 6, wherein said transmitting means includes:

a pulse generator timer; and a light emitting diode responsively connected to said pulse generator timer for transmitting said pulsating beam, which beam comprises infrared light.

12. The system of claim 6 wherein:

said transmitting means transmits a plurality of pulsating light beams at different heights across the path of said door;

said receiving means receives said beams if said beams are not interrupted;

said determining means determines if said receiving means is not receiving pulses from any of said beams; and said means for causing, in response to a determination that a pulse of any of said beams is not received by said receiving means, causes the voltage across said terminals to be within said second predetermined voltage range so that said relay is switched off.

* * * * *